May 20, 1941.     E. MIESEN     2,242,614
DEVICE FOR CONNECTING PARTS OF PORTABLE BUILDINGS
Filed Aug. 1, 1938
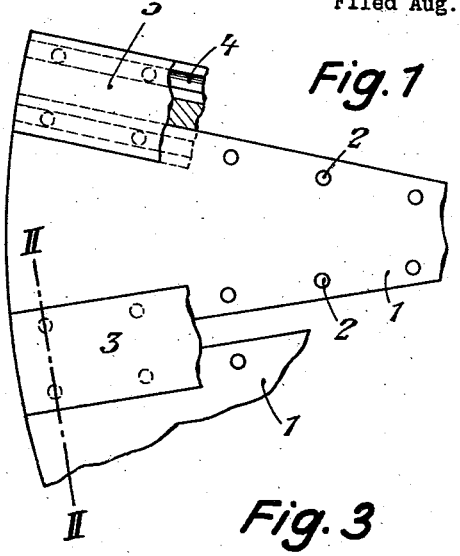
Fig. 1
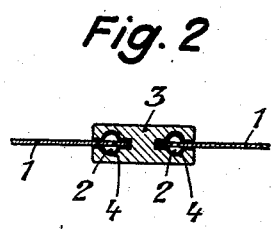
Fig. 2
Fig. 3
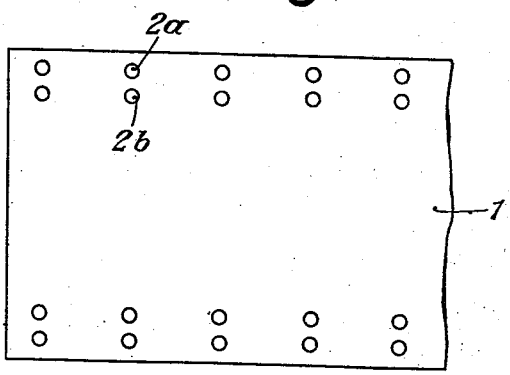
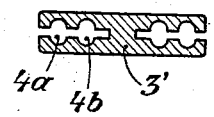
Fig. 4
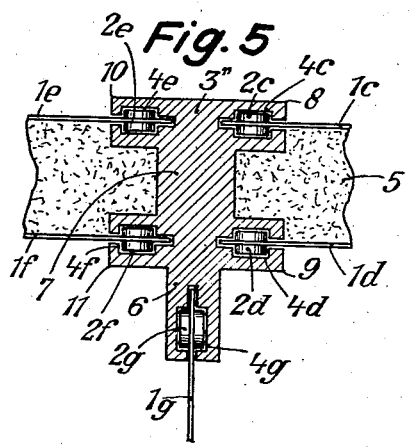
Fig. 5
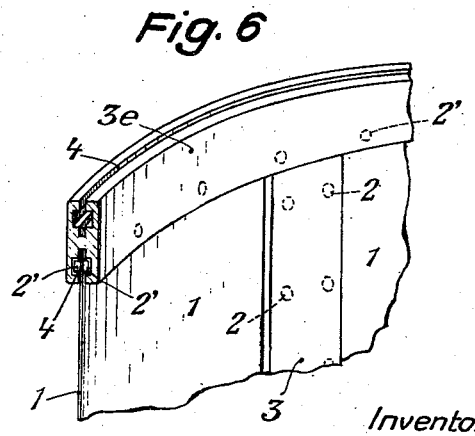
Fig. 6
Inventor:
Erich Miesen
By: Glascock Downing & Seebold
Attys.

Patented May 20, 1941

2,242,614

UNITED STATES PATENT OFFICE 2,242,614

DEVICE FOR CONNECTING PARTS OF PORTABLE BUILDINGS

Erich Miesen, Berlin-Charlottenburg, Germany

Application August 1, 1938, Serial No. 222,466
In Germany March 21, 1936

2 Claims. (Cl. 20—92)

My invention relates to a device for connecting parts of portable buildings arranged to be taken to pieces, in which, as is known in structural architecture, for instance, for supporting glass plates in the frames of hot-house windows, parts are connected by T grooves in the sides of connecting members, and by tongues on the sides of the parts inserted in the T grooves.

It is an object of my invention to so modify a device of this type, that the parts it connects can be flexible.

To this end, I provide the connecting member defining the T grooves as described, but instead of tongues I arrange double-headed rivets along the sides of each part.

It is obvious that the tongues on the parts as made heretofore act as stiffening ribs, and the parts cannot be rolled up for storing and transport. On the other hand, the double-headed rivets according to my invention do not reduce the flexibility of the plates to any appreciable extent, even if such rivets are arranged along all sides of a square, or rectangular plate.

With flexible parts as described, it is also possible to curve the parts in situ, by employing curved and comparatively rigid connecting members.

The shearing strength of my device is almost equal to that of a riveted connection between the connecting members and the parts but has the advantage that the two elements of the connection, the connecting members and the parts, are made ready for use, and so no riveting is done when erecting the building, for instance, a house.

I wish it to be understood, however, that I am not limited to the use of flexible plates in combination with comparatively rigid connecting members, but the plates, or parts, to be connected may be rigid, or, conversely, the connecting members may be flexible. Nor am I limited to a single row of double-headed rivets on the parts but may arrange any desired number of rows and a corresponding number of grooves for the reception of their heads.

In the accompanying drawing, devices embodying my invention are illustrated diagrammatically by way of example.

In the drawing

Fig. 1 is a plan view of two parts, or plates, used in the erection of a house, and two connecting members, all elements being partly broken away.

Fig. 2 is a section on the line II—II in Fig. 1.

Fig. 3 is a plan view of a part, or plate, with two parallel rows of double-headed rivets along both sides.

Fig. 4 is a cross-section of a connecting member for two plates as shown in Fig. 3.

Fig. 5 is a horizontal section of a wall built up of four plates and a single connecting member according to my invention.

Fig. 6 is a perspective illustration showing a pair of flexible plates connected at their sides by a straight connecting member, and at their ends by a curved connecting member.

Referring now to the drawing, and first to Figs. 1 and 2, a pair of parts, here shown as sector shaped plates 1, are connected by members 3. The plates have rivets 2 arranged in rows along their sides with their heads projecting from the two faces of the plates. The connecting members 3 have a T groove 4 in both sides, for the reception of the two plates in their outer, and of the rivet heads in their inner ends. The sides of the plates are inserted in the grooves endwise.

The plates may be flexible or not, as mentioned. In the present instance, it is assumed that they are made of artificial resin, and flexible. The pitch of the rivets 2 is so great that it does not deteriorate their flexibility. The plates can therefore be rolled up for transport like sheets of cardboard and can, if desired, be inserted in curved connecting members, as will be described with reference to Fig. 6. As mentioned, the shearing strength of the connection is considerable, and besides the connection prevents the flow of water from one plate to the other, as the water is conducted away by the T grooves 4.

For a plate as illustrated in Figs. 3 and 4, with two rows of rivets 2a and 2b along its sides, a connecting member 3' is constructed as shown in Fig. 4, with two extensions 4a and 4b in each of its grooves for the reception of the rivet heads. The rivets in the two rows may be staggered if desired.

Referring now to Fig. 5, this shows a structure which is particularly suitable for the outer walls of a house. The connecting member 3" has a central rib 7 which makes up a column of the wall, a strip 8 which projects beyond both sides of the column at the outer side of the wall, and a strip 9 which is arranged similarly at the inner side. Plates 1c and 1d at the right, and 1e and 1f at the left, are inserted in T grooves 4c and 4d in the strips 8 and 9, respectively, at the right, with their double-headed rivets 2c and 2d, and in T grooves 4e and 4f in the same strips at the left, respectively, with their double-headed rivets 2e and 2f. The space between each two parallel plates is filled with a poor heat conductor 5, for instance, glass wool. A rib, or extension, 6 projects from the central rib 7 at its inner side and has a groove 4g for the reception of rivets 2g on a fifth plate 1g which is an inner wall of the house.

Fig. 6 shows a connection for the ends and the sides of a pair of flexible plates 1. The end connecting member 3e whose cross-section is similar to that of the member 3, Fig. 2, is curved and comparatively rigid and flexible plates 1 are inserted in the lower groove 4 of the member 3e with rivets 2' at their ends. The plates when inserted in the lower groove assume the curvature of the end connecting member on account of their flexibility, and their sides are connected by a straight member 3 and double-headed rivets 2, as described with reference to Figs. 1 and 2. Another pair of plates can obviously be inserted in the upper groove 4 of the end connecting member 3e with their ends, and connected at the sides by another member 3.

There is sufficient clearance between the plates and the members in the grooves of the members to permit of free expansion so that the plates will not warp even at high temperature.

A house, or other building, equipped with my device, is easily erected since it is only necessary to push the sides, or ends, of the plates into the grooves in the members, and is as easily taken to pieces for transport.

I claim:

1. In a portable building, a joint comprising plates, a row of double-headed rivets provided at each side edge of said plates, and a connecting member interposed between adjacent plates and having a central rib and pairs of parallel flexible strips projecting beyond the sides of said central rib at both its ends, each strip of said central rib having a T-groove for the slidable reception of said double-headed rivets provided at each side edge of said plates.

2. In a portable building, a joint comprising plates, double-headed rivets provided at each side edge of said plates, a connecting member having a central rib, pairs of parallel flexible strips projecting beyond the sides of said central rib at both its ends, each strip having a T-groove, and a flexible extension projecting from said central rib towards the inner side of the building and having a T-groove in its free end, said double-headed rivets provided at the side edges of said plates being slidably engaged with said T-grooves provided in said flexible strips and said flexible extension of said central rib.

ERICH MIESEN.